(12) United States Patent
Kato et al.

(10) Patent No.: US 8,960,768 B2
(45) Date of Patent: Feb. 24, 2015

(54) STRUCTURE FOR SIDE PORTION OF VEHICLE

(75) Inventors: Seiichi Kato, Wako (JP); Noritaka Kobayashi, Wako (JP); Hideaki Kojima, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/993,844

(22) PCT Filed: Nov. 8, 2011

(86) PCT No.: PCT/JP2011/075675
§ 371 (c)(1),
(2), (4) Date: Aug. 12, 2013

(87) PCT Pub. No.: WO2012/081335
PCT Pub. Date: Jun. 21, 2012

(65) Prior Publication Data
US 2013/0328352 A1   Dec. 12, 2013

(30) Foreign Application Priority Data

Dec. 13, 2010   (JP) ................. 2010-277164

(51) Int. Cl.
  *B60J 5/00*   (2006.01)
  *B62D 25/04*  (2006.01)
  *B60J 5/04*   (2006.01)
(52) U.S. Cl.
  CPC .............. *B62D 25/04* (2013.01); *B60J 5/0458* (2013.01); *B60J 5/0447* (2013.01)
  USPC ............... 296/146.6; 296/187.12; 296/193.05

(58) Field of Classification Search
  CPC ................ B60J 5/00; B60J 5/04; B62D 25/04
  USPC ................ 296/146.6, 187.12, 193.05, 193.06
  See application file for complete search history.

(56) References Cited

U.S. PATENT DOCUMENTS

| 6,450,565 B2* | 9/2002 | Yamamoto ............... 296/187.09 |
| 6,926,340 B2* | 8/2005 | Moriyama ................. 296/146.6 |
| 7,325,862 B2* | 2/2008 | Rieder et al. ............. 296/187.12 |
| 7,331,626 B2* | 2/2008 | Yoshimoto et al. ...... 296/187.12 |
| 2004/0119318 A1* | 6/2004 | Moriyama ................. 296/146.6 |
| 2007/0145772 A1* | 6/2007 | Rieder et al. ............... 296/146.6 |
| 2010/0225141 A1* | 9/2010 | Mori .......................... 296/146.6 |
| 2010/0231003 A1* | 9/2010 | Okumura et al. ........ 296/193.06 |

FOREIGN PATENT DOCUMENTS

| JP | 08-034238 | 2/1996 |
| JP | 8-34238 | 2/1996 |

(Continued)

OTHER PUBLICATIONS

European Search Report dated Apr. 30, 2014, 6 pages.

*Primary Examiner* — Lori L Lyjak
(74) *Attorney, Agent, or Firm* — Rankin, Hill & Clark LLP

(57) ABSTRACT

A structure for a side portion of a vehicle, the structure having a bulkhead provided within a closed cross-section of a center pillar. The bulkhead is disposed so as to be superposed on the lapping section of a lower door beam in the width direction of the vehicle and has a movement restriction section capable of supporting the lapping section. When the lower door beam is moved by a load inputted in the lower door beam from a side of the vehicle, the movement restriction section supports the lapping section of the lower door beam to restrict the movement of the lapping section in the vertical direction.

4 Claims, 11 Drawing Sheets

(56) References Cited

FOREIGN PATENT DOCUMENTS

| JP | 2006205797 | 8/2006 |
|---|---|---|
| JP | 2008-013139 | 1/2008 |
| JP | 2008239108 | 10/2008 |
| JP | 2008239109 | 10/2008 |
| JP | 2008-265607 | 11/2008 |

* cited by examiner

FIG.10
(a)
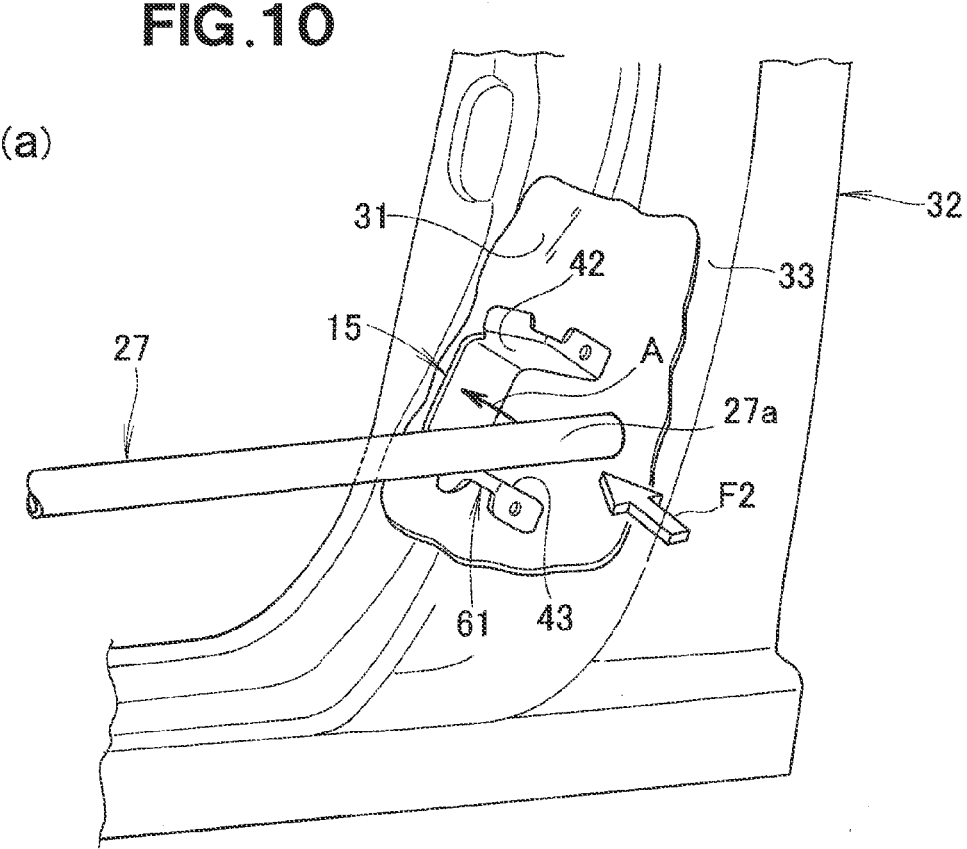
(b)
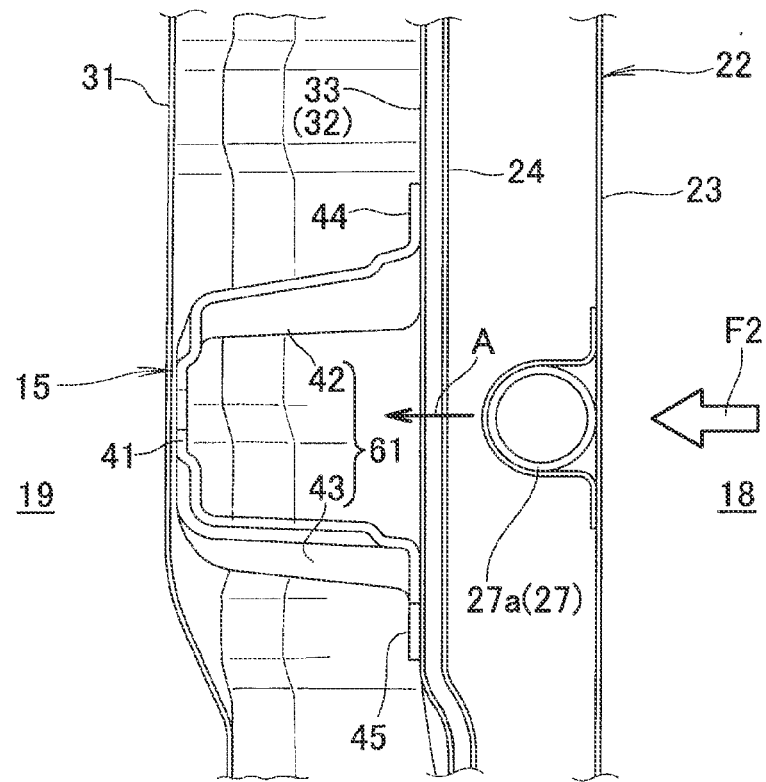

FIG.11
(a)
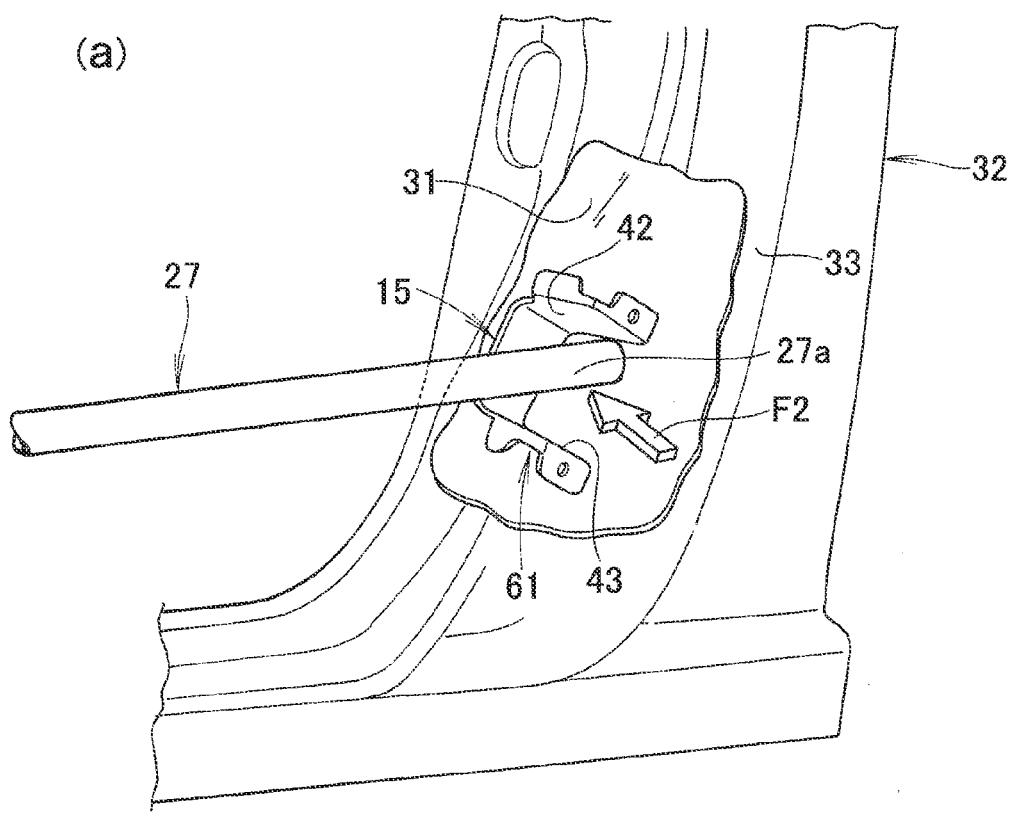
(b)
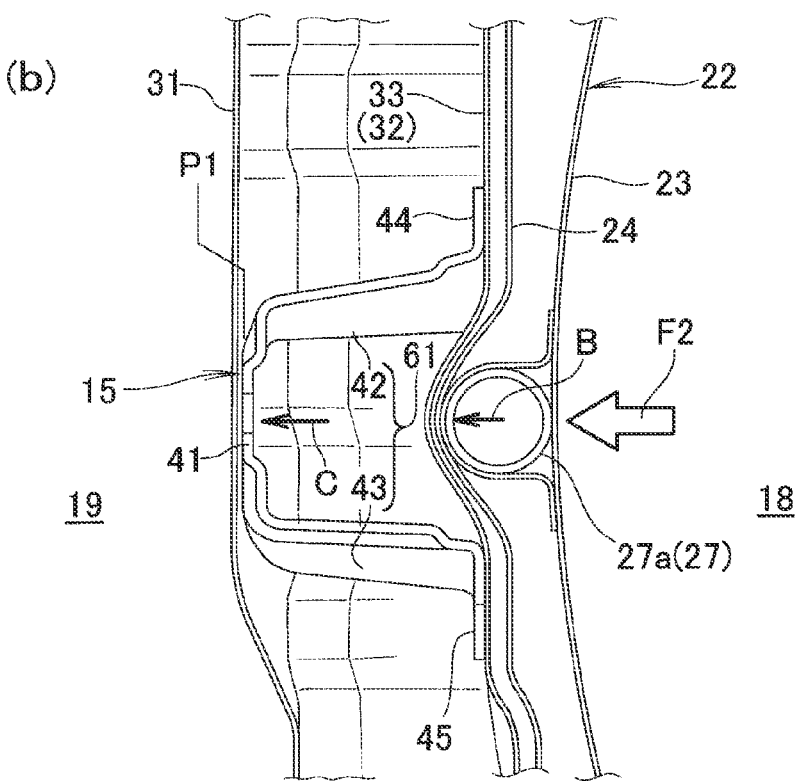

STRUCTURE FOR SIDE PORTION OF VEHICLE

TECHNICAL FIELD

The present invention relates to a vehicle side portion structure which has a door beam provided within a closed space of a door such that an end of the door beam overlaps with a pillar in a vehicle width direction.

BACKGROUND ART

A vehicle side portion structure, which includes a door beam provided within a front side door in a front-rear direction of a vehicle body with a rear-end section being supported by a box-shaped bracket, and a bulkhead (separator member) provided within the box-shaped bracket member, is known from, for example, Patent Literature 1, JP-A 2008-13139.

In the above-described vehicle side portion structure, when an impact load is inputted into the front side door from sideward of the vehicle, the rear end of the door beam is brought into abutment against the bulkhead to thereby disperse the impact load to the vehicle body.

However, in the structure disclosed in Patent Literature 1, it is anticipated that the impact load inputted into the front side door from sideward of the vehicle will deform the front side door to cause the rear end section of the door beam and the bulkhead to move upward. As the door beam rear end and the bulkhead are moved upward, the bracket member and the bulkhead will likely be separated from their respective support portions on the vehicle body, in which instance the support sections can hardly support the bracket and the bulkhead.

Hence, it becomes difficult for an impact load inputted from sideward of the vehicle to the front side door to be suitably born by the vehicle body by causing the impact load to be transmitted through the door beam and bulkhead to the vehicle body. Thus, there is a fear that the door beam and the bulkhead (i.e., front side door) will stick out into a vehicle compartment. Therefore, there has been a demand for a measure to remove the fear.

PRIOR ART LITERATURE

Patent Literature
Patent Literature 1: Japanese Patent Application Laid-Open Publication No. 2008-13139

SUMMARY OF INVENTION

Technical Problem

It is therefore an object of the present invention to provide with a vehicle side portion structure capable of preferably bearing an impact load inputted to a door on the side of a vehicle body.

Solution to Problem

In further accordance with the present invention, there is provided a vehicle side portion structure comprising: a pillar forming a peripheral edge of a door opening in a vehicle body side portion and having a vertically extending closed cross-section defined by a pillar inner panel and a pillar stiffener; a door openably/closably supported in the door opening section and being formed by an outer panel and an inner panel in such a manner as to internally define a closed space; a door beam provided within the closed space so as to extend in a front-and-rear direction of the vehicle body and having a lapping section disposed to overlap with the pillar in a width direction of the vehicle body; and a bulkhead provided within the closed cross-section of the center pillar so as to overlap with the lapping section of the door beam in the vehicle body width direction, wherein the bulkhead has a movement restriction section for restricting movement of the lapping section in a vertical direction by supporting the lapping section of the door beam when the door beam is moved by a load inputted into the door beam from sideward of the vehicle.

In further accordance with the present invention preferably, the bulkhead has a plate thickness dimension greater than those of the inner panel and the pillar stiffener.

In further accordance with the present invention, the bulkhead preferably comprises: upper and lower flanges connected to the pillar stiffener with a predetermined vertically spaced distance therebetween; an upper wall bent relative to and extending from the upper flange toward a vehicle compartment; a lower wall positioned a predetermined distance lower than the upper wall and bent relative to and extending from the lower flange toward the vehicle compartment; and a bottom wall connecting extended distal ends of the upper and lower walls. The bulkhead may be formed into a configuration that opens laterally outwardly of the vehicle body by the upper and lower flanges, the upper and lower walls, and the bottom wall. The upper wall and the lower wall may jointly form the movement restriction section for supporting the lapping section.

In further accordance with the present invention, preferably, the pillar stiffener includes: a side wall provided on an external side of the vehicle body and to which the upper and lower flanges are connected; a front wall bent inwardly of the vehicle compartment and extending from a front end of the side wall; and a rear wall bent inwardly of the vehicle compartment and extending from a rear end portion of the side wall in opposed relation to the front wall. The pillar stiffener may be formed into a substantially U-shape in cross-section by the side wall, the front wall and the rear wall. The bulkhead may have upper and lower sub-flanges connected to the front wall.

In further accordance with the present invention, preferably, the bulkhead has upper and lower beads extending along directions of extension of the upper wall and the lower wall, and the upper bead extends from the upper wall to the bottom wall while the lower bead extends from the lower wall to the bottom wall. In further accordance with the present invention, preferably, the bottom wall of the bulkhead is disposed at a position proximate to the pillar inner panel.

Advantageous Effects of Invention

In further accordance with the present invention, the bulkhead is provided within the closed cross-section of the pillar while the bulkhead is provided with the movement restriction section. The movement restriction section supports the lapping section of the door beam to thereby restrict vertical movement of the lapping section. Namely, the lapping section can be supported so as not to be separated from the movement restriction section (i.e., bulkhead).

With the lapping section being supported by the movement restriction section, an impact load inputted into the door beam (i.e., door) can be suitably transmitted to the vehicle body through the bulkhead. With this arrangement, when an impact load is inputted into the door from sideward of the vehicle body, the bulkhead (i.e., the vehicle body) can suitably support the lapping section so as to prevent protrusion of the door into the vehicle compartment.

In further accordance with the present invention, the plate thickness dimension of the bulkhead is set to be greater than those of the inner panel and the pillar stiffener. With this arrangement, when an impact load acted on the door, the inner panel and the pillar stiffener deform prior to deformation of the bulkhead, so that the lapping section of the door beam may be suitably supported by the movement restriction section.

In further accordance with the present invention, the bulkhead is formed into a simple configuration (i.e., substantially hat-shaped profile) by the upper and lower flanges, the upper and lower walls, and the bottom wall, opening laterally outwardly of the vehicle body. Further, rigidity of the bulkhead is increased by connecting the upper and lower flanges to the pillar stiffener.

Further, by arranging for the bulkhead to open laterally outwardly of the vehicle body, the lapping section of the door beam can be supported in a bitten manner between the upper and lower walls (i.e., by the movement restriction section). As a result, the door beam can be suitably supported with the simply-configured bulkhead so that an impact load inputted into the door will be surely transmitted to the vehicle body.

In further accordance with the present invention, the upper and lower flanges are connected to the side wall while the sub-flanges are connected to the front wall. As a result, the bulkhead is firmly secured to the pillar stiffener. Consequently, this prevents deformation of the upper and lower walls (or movement restriction section) of the bulkhead in the direction of opening thereof, whereby the lapping section of the door beam can be supported by the movement restriction section with increased suitability.

In further accordance with the present invention, the upper bead extends from the upper wall to part of the bottom wall to reinforce the upper wall as well as the upper intersecting section where the upper and bottom walls meet. Similarly, the lower bead extends from the lower wall to part of the bottom wall to reinforce the lower wall as well as the lower intersecting section where the lower and bottom walls meet. This prevents deformation of the upper and lower walls (or movement restriction section) in the direction of opening thereof, whereby the lapping section of the door beam can be supported by the movement restriction section with increases suitability.

In further accordance with the present invention, the bottom wall of the bulkhead is disposed at a position proximate to the pillar inner. This enables the bottom wall of the bulkhead to be promptly brought into abutting engagement with the inner pillar when an impact load is transmitted to the bulkhead. As a result, the impact load transmitted to the bulkhead can be quickly transmitted to the pillar inner panel for being born thereby.

BRIEF DESCRIPTION OF DRAWINGS

FIGS. 10(a) and (b) respectively illustrate in perspective and cross-section examples movements of a lower door beam toward the vehicle compartment.

FIGS. 11(a) and (b) respectively illustrate in perspective and cross-section an example wherein the bulkhead prevents the front side door from sticking out into the vehicle compartment.

DESCRIPTION OF EMBODIMENTS

Figure 1:
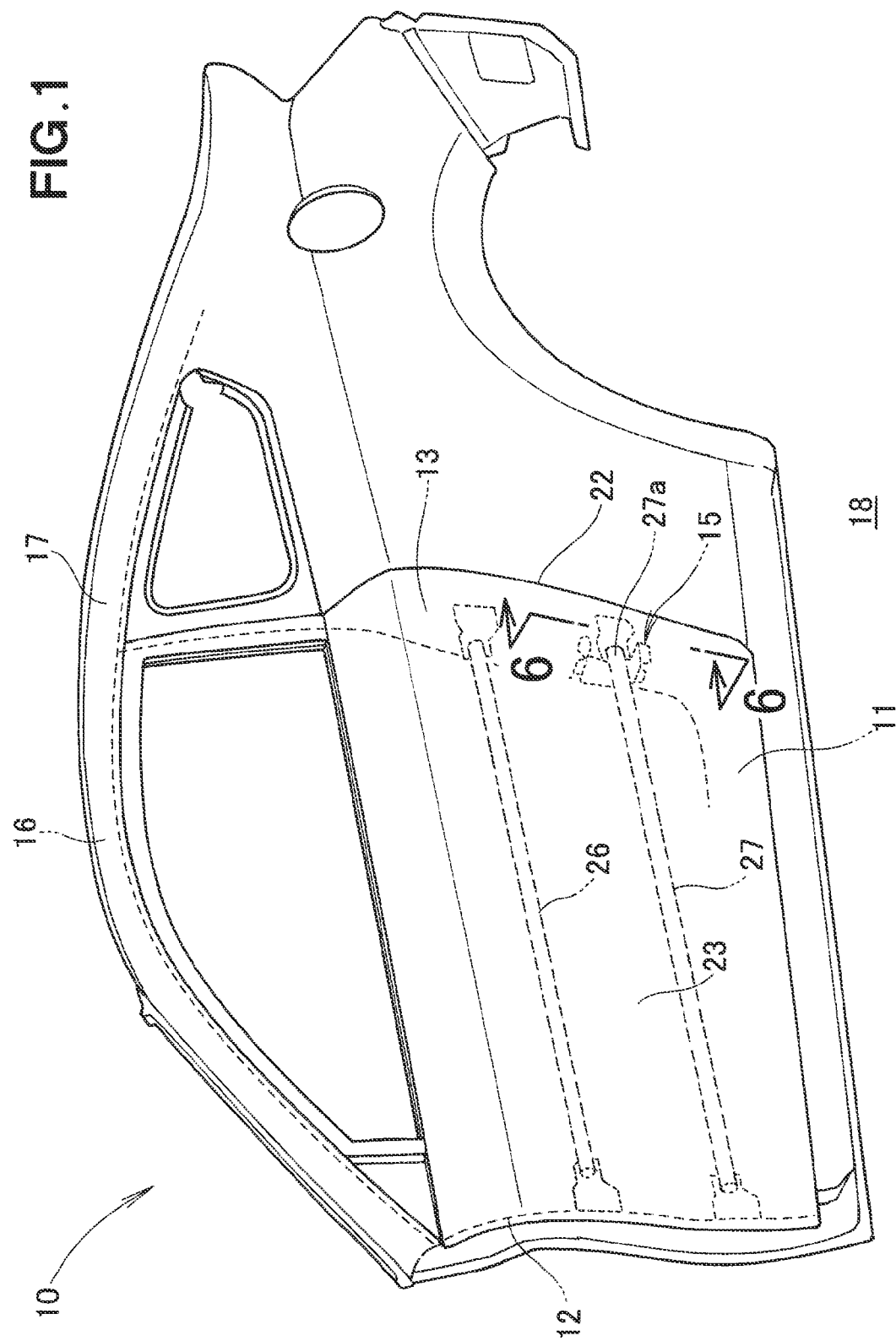
FIG. 1 is a perspective view showing a structure for a side portion of a vehicle, according to the present invention.

Preferred embodiments of the present invention will be described in detail hereunder with reference to the accompanying drawings. In the drawings, the reference characters "Fr", "Rr", "L" and "R" respectively represent "front", "rear", "left" and "right" directions of a vehicle.

Figure 2:
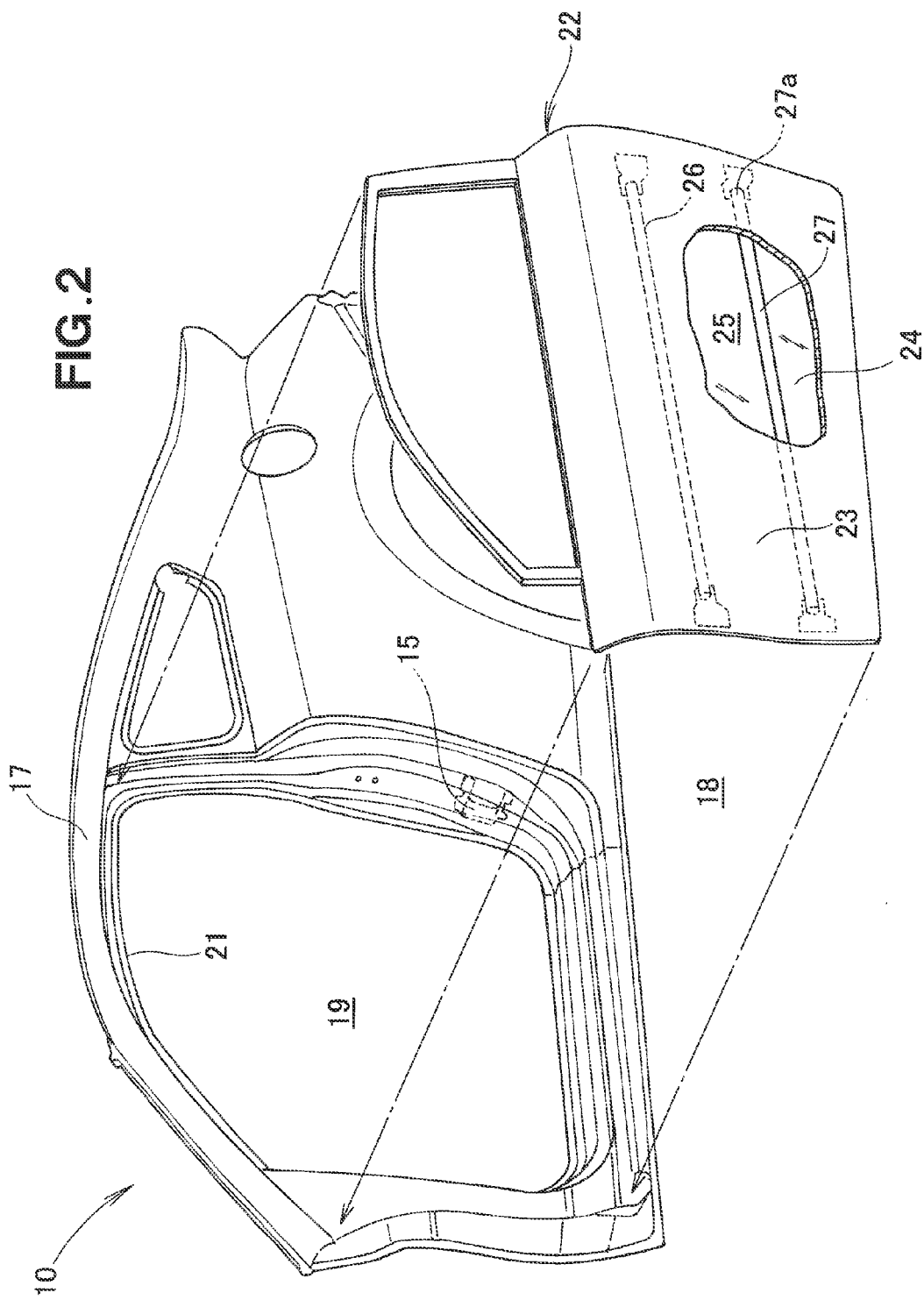
FIG. 2 is a perspective view of the side portion structure of the vehicle shown in FIG. 1, with a front side door disassembled from the vehicle.

Embodiments:

As shown in FIGS. 1 and 2, a vehicle side portion structure 10 includes a side sill 11 positioned at a lower side of a vehicle body and extending in a front-rear direction of the vehicle body, a front pillar 12 rising upward from an front end portion of the side sill 11, a center pillar (pillar) 13 rising upward from a partway section in the vehicle front-rear direction of the side sill 11, a bulkhead 15 provided within the center pillar 13, a roof side rail 16 provided at an upper side portion of the vehicle body and supported by respective upper end portions of the front pillar 12 and the center pillar 13, and a side panel 17 for covering the roof side rail 16 and the center pillar 13 from outside of the vehicle 18.

The vehicle side portion structure 10 further includes a door opening section 21 formed by the side sill 11, the front pillar 12, the center pillar 13 and the roof side rail 16 on the side portion of the vehicle body, and a front side door 22 openably/closably supported by the door opening section 21.

The front side door 22 is openably/closably supported in the door opening section 21 through front hinges (not shown). The front side door 22 has an outer panel 23 provided closely to a vehicle exterior 18, an inner panel 24 provided closer to a vehicle compartment 19 than the outer panel 23, and upper and lower door beams 26, 27. A closed space 25 is defined by the outer panel 23 and inner panel 24, and the upper door beam 26 and lower door beam 27 are provided within the closed space 25.

The upper door beam 26 is provided so as to extend in a front-rear direction of the vehicle body at an upper position in the closed space 25 of the front side door 22. The lower door beam 27 is provided so as to extend in the front-rear direction of the vehicle body at a position lower than the upper door beam 26 in the closed space 25.

The lower door beam 27 has a rear end section 27a extending to overlap with a vehicle-width-direction external side of the center pillar 13. Hereinafter, the rear end section 27a of the lower door beam 27 will be referred to as a "lapping section". Specifically, the lapping section 27a is disposed at a position to overlap the center pillar 13 in the vehicle width direction (see also FIG. 6).

Figure 3:
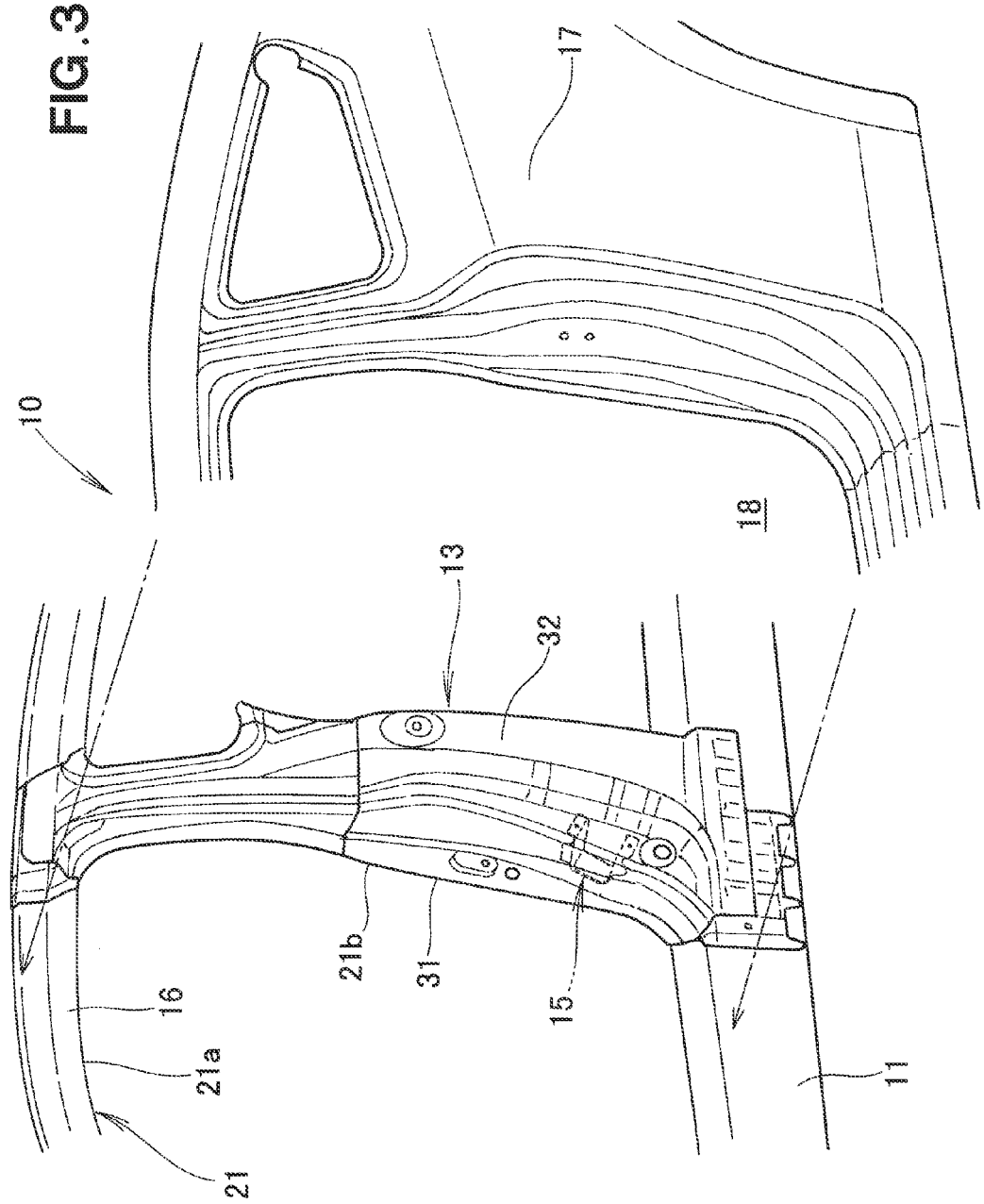
FIG. 3 is a perspective view of a center pillar shown in FIG. 2.

As shown in FIG. 3, the center pillar 13 is disposed to extend substantially vertically between the side sill 11 and the roof side rail 16 so as to provide a rear vertical peripheral edge 21b of a peripheral edge 21a of the door opening section 21. The center pillar 13 is comprised of a pillar inner panel 31 (see also FIG. 6) disposed on the side of the vehicle compartment 19 and extending in a vertical direction and a pillar stiffener 32 superposed on the pillar inner panel 31 from the vehicle exterior 18. A closed cross-section is formed to extend in a vertical direction by thus superposing the pillar stiffener 32 on the pillar inner panel 31.

Figure 4:
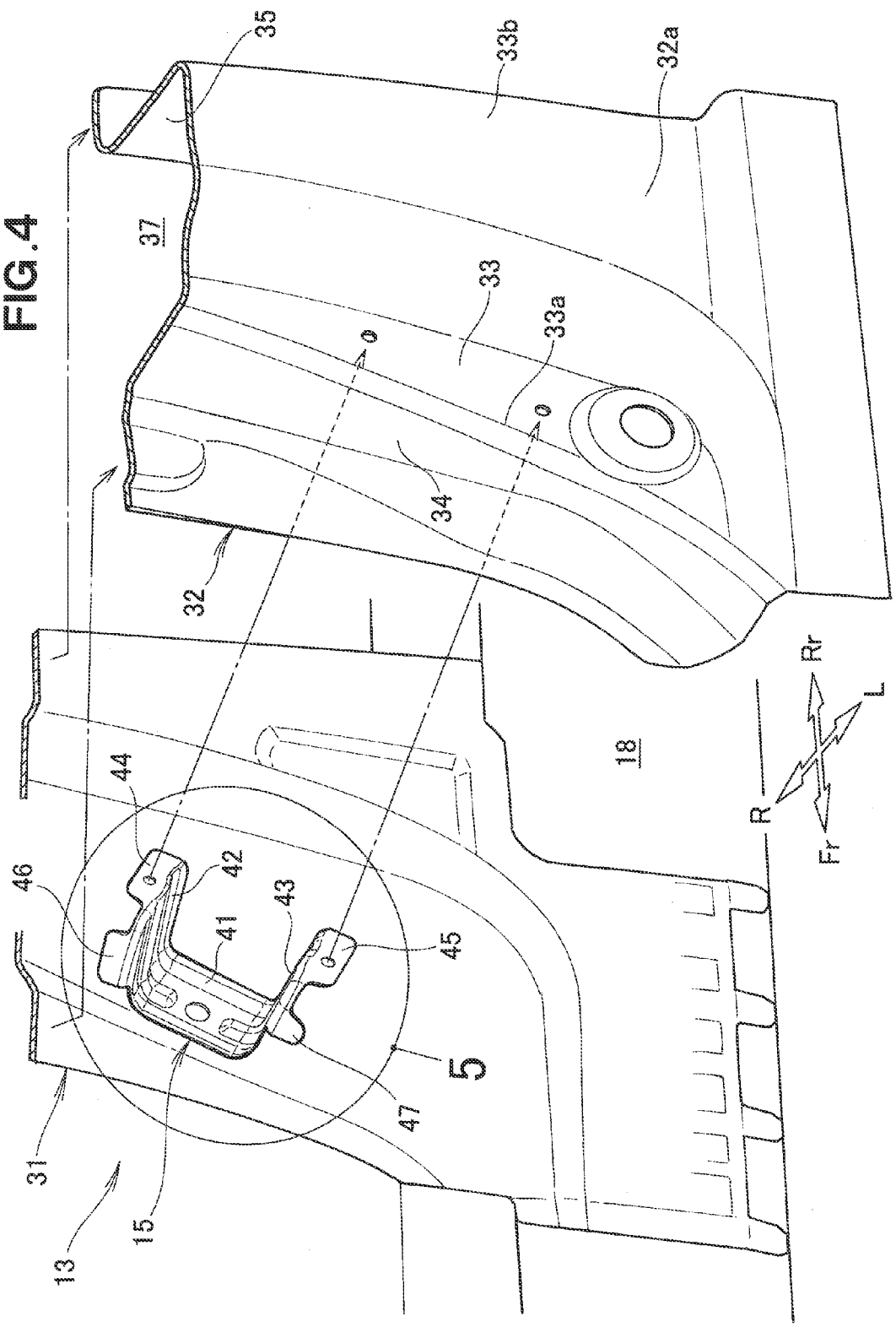
FIG. 4 is an exploded perspective view of the center pillar and a bulkhead shown in FIG. 3.

As shown in FIG. 4, the pillar stiffener 32 has a side wall 33 provided on the side of the vehicle exterior 18, a front wall 34 bent and extending from a front end portion 33a of the side wall 33 inwardly toward the vehicle compartment 19, and a rear wall 35 bent and extending from a rear end portion 33b of the side wall 33 inwardly toward the vehicle compartment 19 and opposed to the front wall 34.

The pillar stiffener 32 is formed into a substantially U-shape in cross-section by the side wall 33, the front wall 34, and the rear wall 35. By superposing the pillar stiffener 32 on the pillar inner panel 31, the center pillar 13 is formed to have the closed cross-section that extends in a vertical direction. That is, the center pillar 13 has a pillar closed space 37.

The bulkhead 15 is provided within the center pillar 13 (pillar closed space 37). The bulkhead 15 is provided within the closed cross-section of the center pillar 13 by being spot-weld-connected to a lower end portion 32a of the pillar stiffener 32. The bulkhead 15 is, as shown in FIG. 6, disposed so as to overlap with the lapping section 27a of the lower door beam 27 in the vehicle width direction (as arrowed).

Figure 5:
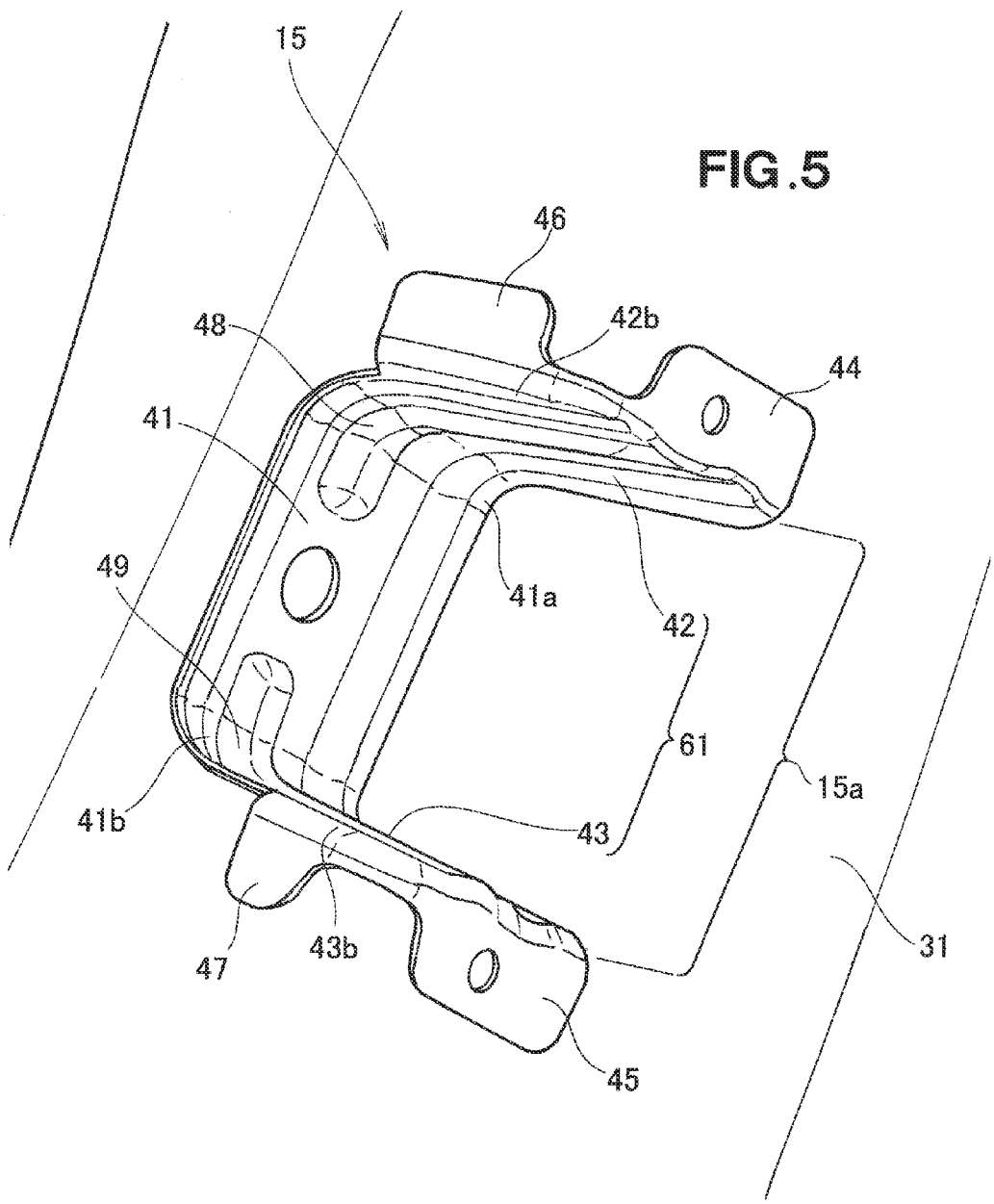
FIG. 5 is an enlarged view showing Region 5 of FIG. 4.
Figure 6:
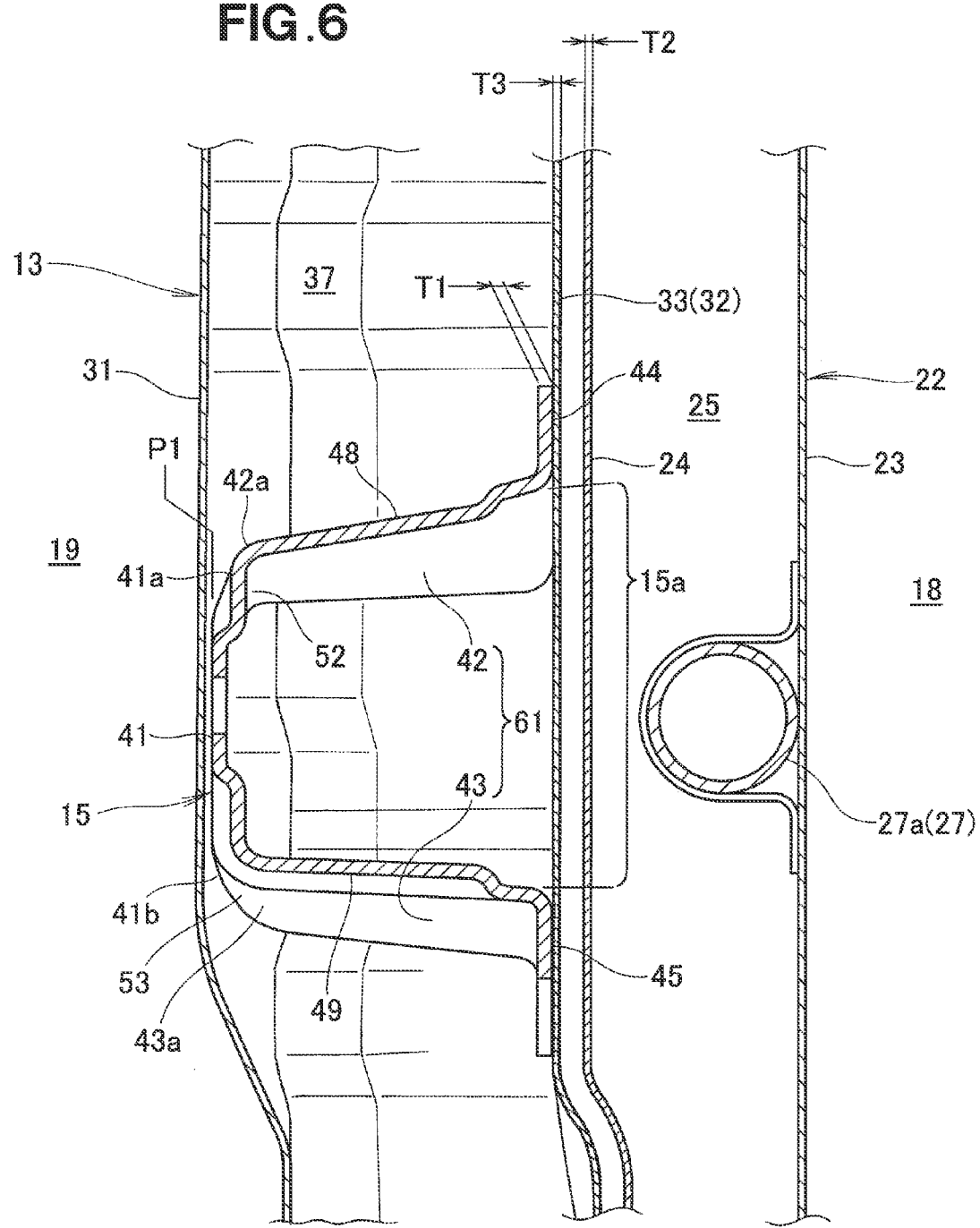
FIG. 6 is a cross-sectional view taken along line 6-6 of FIG. 1.

As shown in FIGS. 5 and 6, the bulkhead 15 is formed to have a plate thickness dimension T1 and has a bottom wall 41, upper and lower walls 42, 43, upper and lower flanges 44, 45, upper and lower sub-flanges 46, 47, sub-flange and upper and lower beads 48, 49. The plate thickness dimension T1 of the bulkhead 15 is set to be greater than a plate thickness dimension T2 of the inner panel 24 and a plate thickness dimension T3 of the pillar stiffener 32. The bulkhead 15 is formed into a generally hat shape by the bottom wall 41, the upper and lower walls 42, 43 and the upper and lower flanges 44, 45.

The upper flange 44 and the lower flange 45 are vertically spaced a predetermined distance from each other and connected to the side wall 33 of the pillar stiffener 32 by spot welding. The upper flange 44 is bent upward from a vehicle-width-direction outer end of the upper wall 42 to provide a connector part. The lower flange 45 is bent downward from a vehicle-width-direction outer end of the lower wall 43 to provide a connector part. The bulkhead 15 is formed into a generally hat shape with the upper and lower flanges 44, 45 (i.e., a region corresponding to the opening 15a of the generally hat shape) connected to the side wall 33 of the pillar stiffener 32 so as to impart increased rigidity thereto.

The upper wall 42 is a substantially rectangular-shaped part bent and extending from the upper flange 44 toward the vehicle compartment 19 up to an upper end portion 41a of the bottom wall 41 toward the vehicle compartment 19. The lower wall 43 is bent and extends from the lower flange 45 toward the vehicle compartment 19 up to a lower end portion 41b of the bottom wall 41 toward the vehicle compartment 19. The lower wall 43 is provided at a position downwardly spaced a predetermined interval from the upper wall 42. With the predetermined interval left between the lower wall 43 and the upper wall 42, the opening 15a of the bulkhead 15 is defined. The thus-defined opening 15a of the bulkhead 15 can accommodate the lapping section 27a of the lower door beam 27.

The bottom wall 41 is a part that connects a distal end 42a of the extended upper wall 42 and a distal end 43a of the extended lower wall 43. The bottom wall 41 is disposed at a position P1 close to the pillar inner panel 31.

When a load acts on the bulkhead 15 toward the vehicle compartment 19, the bulkhead 15 is assumed to move toward the vehicle compartment 19. In this instance, the bottom wall 41 of the bulkhead 15 is swiftly brought into abutment against the pillar inner panel 31 to thereby support the bottom wall 41 by the pillar inner panel 31.

The bulkhead 15, as described above, has a hat-shaped configuration defined by such parts, namely, upper and lower flanges 44, 45, upper and lower walls 42, 43 and bottom wall 41 and opening toward laterally outside of the vehicle. By virtue of the bulkhead 15 formed into the substantially hat-shaped profile, the bulkhead 15 is simplified in configuration.

Further, by thus configuring the bulkhead 15 into a generally hat shape, it becomes possible for the bulkhead 15 to open toward laterally outside of the vehicle. Accordingly, the opening 15a, defined between the upper and lower walls 42, 43 of the bulkhead 15, can be disposed in opposed relation to the lapping section 27a of the lower door beam 27. As a result, the lapping section 27a of the lower door beam 27 can be supported by the upper and lower walls 42, 43, that may be called movement restriction section 61, as if the lapping section 27a is lockingly engaged between the upper and lower walls 42, 43.

Figure 7:
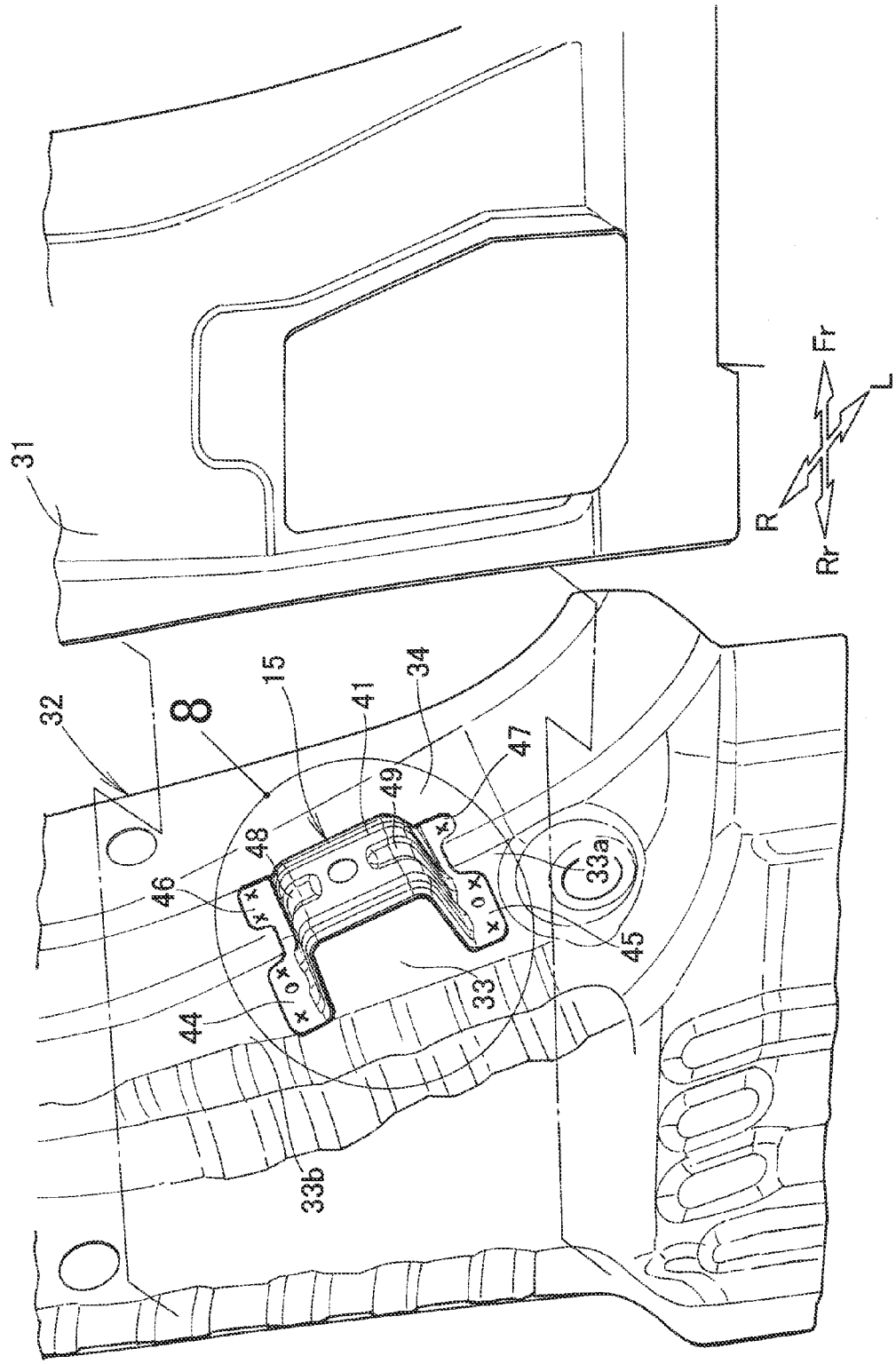
FIG. 7 is an exploded perspective view of the center pillar and the bulkhead as seen from a vehicle compartment.
Figure 8:
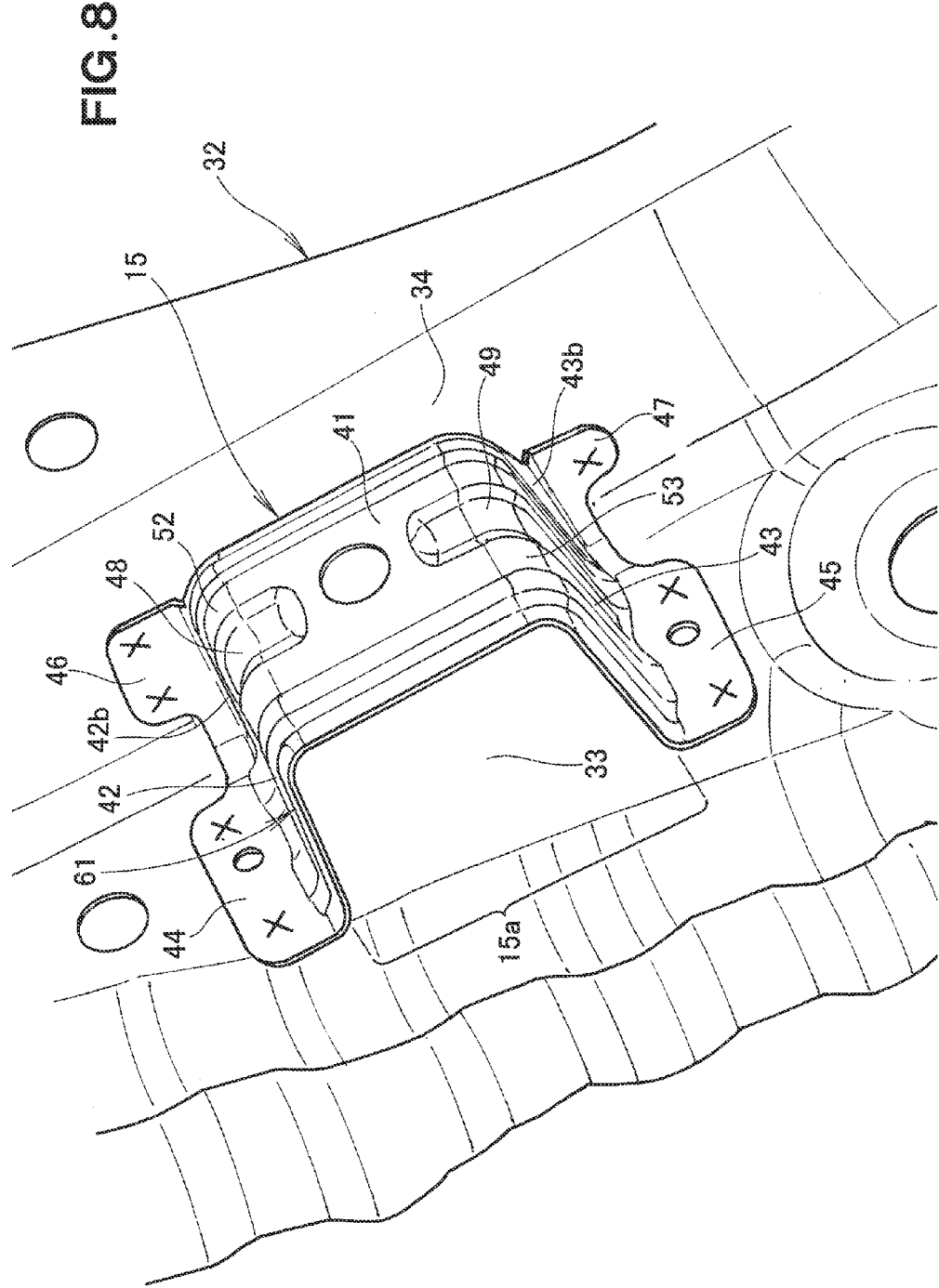
FIG. 8 is an enlarged view showing Region 8 of FIG. 7, and the bulkhead in perspective.

As shown in FIGS. 7 and 8, the upper sub-flange 46 is in the form of a connecting piece extending upwardly from a front end portion 42b of the upper wall 42. The upper wall 46 is connected by spot-welding to the front wall 34 of the pillar stiffener 32. The sub-flange 47 is in the form of a connecting piece extending downwardly from a front end portion 43b of the lower wall 43. The sub-flange 47 is connected to the front wall 34 of the pillar stiffener 32 by spot welding.

As described above, the upper and lower sub-flanges 46, 47 are connected to the front wall 34 of the pillar stiffener 32 while the upper and lower flanges 44, 45 are connected to the side wall 33 of the pillar stiffener 32. In this manner, the bulkhead 15 is firmly connected to the front wall 34 of the pillar stiffener 32, imparting desired rigidity to the bulkhead 15.

As shown in FIGS. 6 and 8, the upper bead 48 bulges inwardly of the bulkhead 15 to provide a reinforcing recess on an external surface of the bulkhead 15. The upper bead 48 extends from the upper wall 42 to the bottom wall 41 to have a form of substantially L-shape.

Specifically, the upper bead 48 extends from the vicinity of the upper flange 44 of the upper wall 42 along the direction of extension of the upper wall 42 into the bottom wall 41 past an upper intersecting portion 52. By arranging the upper bead 48 to extend from the upper wall 42 into the bottom wall 41, it becomes possible to reinforce the upper wall 42 as well as the upper intersecting section 52 where the upper wall 42 and the bottom wall 41 meet.

The lower bead 49 is arranged to bulge inwardly of the bulkhead 15 to provide a concave, reinforcing recess on the outer surface of the bulkhead 15. The lower bead 49 extends from the lower wall 43 into the bottom wall 41 so as to have a form of substantially L-shape.

Specifically, the lower bead 49 extends from the vicinity of the lower flange 45 of the lower wall 43 along the direction of extension of the lower wall 43 into the bottom wall 41 past a lower intersecting portion 53 where the lower wall 43 and the bottom wall 41 meet. Owing to the lower bead 49 arranged to extend from the lower wall 43 into the bottom wall, it becomes possible to reinforce the lower wall 41 as well as the lower intersecting section 53 where the lower wall 43 and the bottom wall 41 meet.

With the upper wall 42 and the upper intersecting section 52 being thus reinforced by the upper bead 48 and with the lower wall 43 and the lower intersecting section 53 being thus reinforced by the lower bead 49, it becomes possible to prevent the upper and lower walls from deforming in the direction of opening thereof.

The movement restriction section 61 is formed by the upper wall 42 and the lower wall 43 of the bulkhead 15. The movement restriction section 61 is designed to receive the lapping section 27a of the lower door beam 27 between the upper wall 42 and the lower wall 43 to support the lapping section 27a with the upper and lower walls 42, 43.

Namely, when the lower door beam 27 is moved by an impact load inputted into the lower door beam 27 from sideward of the vehicle, the lapping section 27a of the lower door beam 27 is received between the upper and lower walls 42, 43 of the movement restriction section 61.

By thus receiving the lapping section 27a in the movement restriction section 61, the lapping section 27a is supported by the movement restriction section 61, whereby the lapping section 27a is restricted to move in a vertical direction (particularly, upward direction). Thus, the lower beam 27 is suitably supported by the bulkhead 15, whereby an impact load inputted into the front side door 22 can be surely transmitted to the vehicle body (center pillar 13).

By thus suitably supporting the lower door beam 27 with the bulkhead 15, the front side door 22 can be prevented from intruding into the vehicle compartment 19 when an impact load is inputted into the front side door 22 from sideward of the vehicle.

The upper and lower flanges 44, 45 are connected to the side wall 33 of the pillar stiffener 32 while the upper and lower sub-flanges 46, 47 are connected to the front wall 34 of the pillar stiffener 32. Thus, the bulkhead 15 (movement restriction section 61) can be firmly connected to the pillar stiffener 32.

Further, rigidity of the bulkhead 15 is increased by reinforcing the upper wall 42 and the upper intersecting section 52 with the upper bead 48 and by reinforcing the lower wall 43 and the lower intersecting section 53 with the lower bead 49. Consequently, deformation of the movement restriction section 61 (i.e. upper and lower walls 42, 43) in the opening direction can be prevented. Thus, the lapping section 27a of the lower door beam 27 can be suitably supported by the movement restriction movement 61.

In addition, the plate thickness dimension T1 of the bulkhead 15 is set to be greater than the plate thickness dimension T2 of the inner panel 24 and the plate thickness dimension T3 of the pillar stiffener 32. Hence, the inner panel 24 and the pillar stiffener 32 can be deformed prior to deformation of the bulkhead 15 is brought about when an impact load is inputted into the front side door 22 from outside the vehicle 18. By virtue of the deformation of the inner panel 24 and the pillar stiffener 32, the lapping section 27a of the lower door beam 27 can be suitably moved into the movement restriction section 61.

By thus suitably moving the lapping section 27a into the movement restriction section 61, the lapping section 27a can be suitably supported by the movement restriction section 61.

Further, the bottom wall 41 of the bulkhead 15 is disposed at the position P1 close to the pillar inner panel 31. Thus, the bottom wall 41 of the bulkhead 15 can be brought into abutment with the pillar inner panel 31 promptly when an impact load is transmitted to the bulkhead 15 from outside of the vehicle 18. Thus, an impact load transmitted to the bulkhead 15 can be relayed onto the pillar inner panel 31 promptly through the bulkhead 15, and the impact load can be suitably borne by the pillar inner panel 31.

Description will be made next, with reference to FIGS. 9 through 11, as to an example wherein the lower door beam 27 is prevented from intruding into the vehicle compartment 19 by restricting the movement of the lower door beam 27 (and hence the front side door 22) in the vertical direction (particularly, upward direction). In FIG. 10(a) and FIG. 11(a), description will be made with the front side door 22 (particularly, inner panel 24) omitted in order to facilitate ready understanding.

Figure 9:
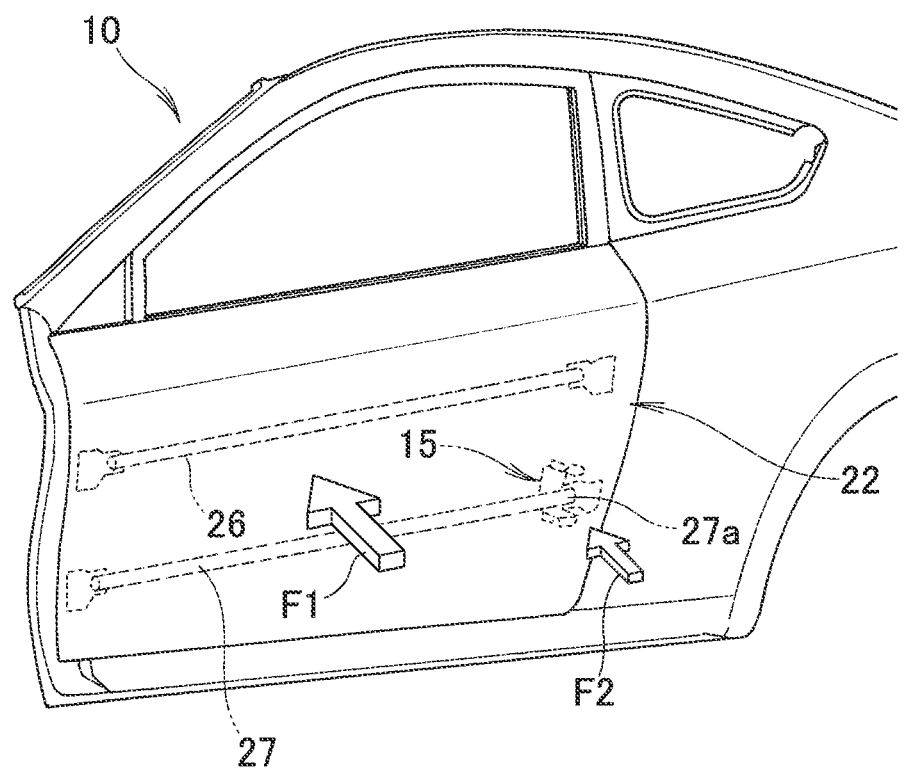
FIG. 9 is a perspective view showing an example mode in which an impact load is inputted to the front side door from sideward of the vehicle.

As shown in FIG. 9, an impact load F1 is inputted into the front side door 22 from sideward of the vehicle as indicated by an arrow. As the impact load F1 is so inputted, part of the impact load F1 is transmitted to the lapping section 27a of the lower door beam 27 as load F2 as indicated by an arrow.

As shown in FIGS. 10(a) and 10(b), the load F2 transmitted to the lapping section 27a of the lower door beam 27 causes the outer panel 23 of the front side door 22 to deform and the lapping section 27a to move toward the vehicle compartment 19 as shown by arrow A. Movement of the lapping section 27a toward the vehicle compartment 19 as indicated by arrow A brings the lapping section 27a into abutment against the inner panel 24 of the front side door 22.

As shown in FIGS. 11(a) and (b), the inner panel 24 deforms toward the vehicle compartment 19 as a result of abutment of the lapping section 27a against the inner panel 24. Deformation of the inner panel 24 toward the vehicle compartment 19 causes the inner panel 24 to abut against the pillar stiffener 32 of the center pillar 13. Abutment of the pillar stiffener 32 against the pillar stiffener 32 causes the pillar stiffener 32 to deform toward the vehicle compartment 19. Accordingly, the inner panel 24 and the pillar stiffener 32 deform in a warped fashion as indicated by arrow B to cause the lapping section 27a of the lower door beam 27 to enter (or move) into the movement restriction section 61.

By thus arranging the movement restriction section 61 to accommodate the lapping section 27a of the lower door beam 27, the lapping section 27a can be supported by the movement restriction section 61 (between the upper and lower walls 42, 43). Consequently, the movement restriction section 61 restricts upward movement of the lapping section 27a (and hence the front side door 22). That is, the lapping section 27a can be supported by the movement restriction section 61 (i.e., bulkhead 15) in such a manner as not to be separated therefrom. By thus restricting vertical movement, particularly upward movement, of the lapping section 27a, the load F2 is transmitted to the bulkhead 15 through the lapping section 27a.

Once the load F2 is transmitted to the bulkhead 15, the bulkhead 15 moves toward the vehicle compartment 19, as shown by arrow C. The bottom wall 41 of the bulkhead 15 is disposed at the close position P1 of the pillar inner panel 31. Therefore, by moving the bulkhead 15 toward the vehicle compartment 19, the bottom wall 41 of the bulkhead 15 is quickly brought into abutting engagement with the pillar inner panel 31. The load F2 transmitted to the bulkhead 15 is promptly relayed onto the pillar inner panel 31 through the bulkhead 15 and suitably supported by the pillar inner panel 31.

By virtue of the bulkhead 15 thus provided within the center pillar 13, upward movement of the lapping section 27a (and hence the front side door 22) is restricted by the movement restriction section 61. Therefore, the load F2 transmitted to the lapping section 27a, which is suitably supported by the bulkhead 15, can be surely and promptly relayed onto the vehicle body (center pillar 13).

With this arrangement, part of the load F2 (see FIG. 9) inputted into the front side door 22 from sideward of the vehicle can be transmitted promptly to the vehicle body (center pillar 13). Namely, quick support of the lapping section 27a with the bulkhead 15 becomes possible and this further prevents the front side door 22 from entering into the vehicle compartment 19.

The vehicle side portion structure according to the present invention should not be construed as being limited to the above embodiment but may be modified or improved as desired or as required. For example, in the above-described embodiments, description has been made as to the case wherein the lapping section 27a is comprised of the rear end section of the lower door beam 27. However, the lapping section 27a is not limited to the rear end section and may be comprised of a front end section of the lower door beam 27.

In the above embodiment, although the front side door 22 has been described as a door example, the present invention may be applied to other doors such as a rear side door and the like.

Further, in the above embodiment, although the center pillar 13 has been described as a pillar example, the present invention may be applied to other pillars, such as a front pillar or the like.

It should also be appreciated that the vehicle side portion structure 10, the center pillar 13, the bulkhead 15, the door opening section 21, the front side door 22, the outer panel 23, the inner panel 24, the lower door beam 27, the lapping section 27a, the pillar inner panel 31, the pillar stiffener 32, the side wall 33, the front wall 34, the rear wall 35, the bottom wall 41, the upper and lower walls 42, 43, the upper and lower flanges 44, 45, the upper and lower sub-flanges 46, 47, the upper and lower beads 48, 49, and the movement restriction section 61 are not limited to the described exemplary configurations and arrangements and may be altered as desired or required.

INDUSTRIAL APPLICABILITY

The present invention is particularly suitable for application to a vehicular side portion structure in which a door beam is provided within a closed space of a door, and an end of the door beam is provided in a laterally overlapping relation to a pillar.

REFERENCE SIGNS LIST 10 c vehicle side portion structure, 13 c center pillar (pillar), 15 c bulkhead, 18 c outside of the vehicle, 19 c vehicle compartment, 21 c door opening section, 21a c peripheral edge of the door opening section, 21b c rear vertical peripheral edge of the door opening, 22 c front side door (door), 23 c outer panel, 24 c inner panel, 25 c closed space, 27 c lower door beam (door beam), 27a c lapping section (rear end), 31 c pillar inner panel, 32 c pillar stiffener, 33 c side wall, 34 c front wall, 35 c rear wall, 37 c pillar closed space, 41 c bottom wall, 42, 43 c upper and lower walls, 42a c extension distal end of the upper wall, 43a c extension distal end of the lower wall, 44, 45 c upper and lower flanges, 46, 47 c upper and lower sub-flanges (sub-flanges), 48, 49 c upper and lower beads, 61 c movement restriction section, P1 c close position of the pillar inner, T1 c plate thickness dimension of the bulkhead, T2 c plate thickness dimension of the inner panel, T3 c plate thickness dimension of the pillar stiffener

The invention claimed is:

1. A vehicle side portion structure comprising:
a pillar forming a peripheral edge of a door opening section in a vehicle body side portion and having a vertically extending closed cross-section defined by a pillar inner panel and a pillar stiffener;
a door openably/closably supported in the door opening section and being formed by an outer panel and an inner panel in such a manner as to internally define a closed space;
a door beam provided within the closed space so as to extend in a front-and-rear direction of the vehicle body and having a lapping section disposed to overlap with the pillar in a width direction of the vehicle body; and
a bulkhead provided within the closed cross-section of the pillar so as to overlap with the lapping section of the door beam in the vehicle body width direction,
wherein the pillar stiffener includes:
a side wall provided on an external side of the vehicle body;
a front wall bent inwardly of a vehicle compartment and extending from a front end portion of the side wall; and
a rear wall bent inwardly of the vehicle compartment and extending from a rear end portion of the side wall in opposed relation to the front wall, and
wherein the pillar stiffener is formed into a substantially U-shape in cross-section by the side wall, the front wall and the rear wall, and
wherein the bulkhead comprises:
upper and lower flanges connected to the side wall of the pillar stiffener with a predetermined vertically spaced distance therebetween;
an upper wall bent relative to and extending from the upper flange toward the vehicle compartment;
a lower wall positioned a predetermined distance lower than the upper wall and bent relative to and extending from the lower flange toward the vehicle compartment;
a bottom wall connecting distal ends of the upper and lower walls, the bottom wall being disposed at a position proximate to the pillar inner panel;
an upper sub-flange bent upward from the upper wall and connected to the front wall of the pillar stiffener;
a lower sub-flange bent downward from the lower wall and connected to the front wall of the pillar stiffener,
wherein the bulkhead is formed into a configuration that opens laterally outwardly of the vehicle body by the upper and lower flanges, the upper and lower walls, and the bottom wall, and
wherein the bulkhead has a movement restriction section formed by the upper wall and the lower wall of the bulkhead and restricting movement of the lapping section in a vertical direction by supporting the lapping section of the door beam by the upper wall and the lower wall with the lapping section received between the upper wall and the lower wall when the door beam is moved by a load inputted into the door beam from sideward of the vehicle.

2. The vehicle side portion structure of claim 1, wherein the bulkhead has a plate thickness dimension greater than those of the inner panel and the pillar stiffener.

3. The vehicle side portion structure of claim 1, wherein the bulkhead has upper and lower beads extending along directions of extension of the upper wall and the lower wall, and the upper bead extends from the upper wall to the bottom wall while the lower bead extends from the lower wall to the bottom wall.

4. The vehicle side portion structure of claim 1, wherein the bulkhead has upper and lower beads extending along directions of extension of the upper wall and the lower wall, the upper bead extends from the upper wall up to part of the bottom wall while the lower bead extends from the lower wall up to part of the bottom wall.

* * * * *